US010846677B2

(12) United States Patent
McMahon et al.

(10) Patent No.: US 10,846,677 B2
(45) Date of Patent: Nov. 24, 2020

(54) SYSTEM AND METHOD FOR SECURE DETOKENIZATION

(71) Applicant: MERCHANT LINK, LLC, Silver Spring, MD (US)

(72) Inventors: Christian Andreas McMahon, Annapolis, MD (US); Michael Paul Ryan, Cedar Park, TX (US); Ketul Mayurbhai Shah, Glen Burnie, MD (US)

(73) Assignee: MERCHANT LINK, LLC, Silver Spring, MD (US)

( * ) Notice: Subject to any disclaimer, the term of this patent is extended or adjusted under 35 U.S.C. 154(b) by 131 days.

(21) Appl. No.: 16/245,813

(22) Filed: Jan. 11, 2019

(65) Prior Publication Data
US 2020/0226576 A1 Jul. 16, 2020

(51) Int. Cl.
*G06Q 20/00* (2012.01)
*G06Q 40/00* (2012.01)
*G06F 7/04* (2006.01)
*G06F 15/16* (2006.01)
*G06Q 20/20* (2012.01)
(Continued)

(52) U.S. Cl.
CPC .......... *G06Q 20/206* (2013.01); *G06Q 20/40* (2013.01); *H04L 63/0807* (2013.01); *H04L 63/123* (2013.01)

(58) Field of Classification Search
None
See application file for complete search history.

(56) References Cited

U.S. PATENT DOCUMENTS

| 5,978,918 | A | 11/1999 | Scholnick et al. |
| 6,332,193 | B1 | 12/2001 | Glass et al. |
| 6,560,709 | B1 | 5/2003 | Galovich |

(Continued)

FOREIGN PATENT DOCUMENTS

| CA | 2606183 | 9/2012 |
| CA | 2795249 | 1/2014 |

(Continued)

OTHER PUBLICATIONS

Shift4 Releases New Technology to Insure the Security of Its Merchants' and Partners' Payment Processing, Tokenization Moves the Liability for Securing Credit Carri Data Away from Merchants' and POS Application Developers, Las Veags, Nevada, Oct. 5, 2005, 2 pages.

(Continued)

*Primary Examiner* — Ariel J Yu
(74) *Attorney, Agent, or Firm* — Jackson Walker LLP; Christopher J. Rourk

(57) ABSTRACT

A system for accessing protected data comprising a token retriever system operating on a processor and configured to receive a token from a user and to transmit a request including the token to a detokenization system over a data communications medium. The detokenization system configured to receive the token, to verify that the request has been received from an authorized source, and to transmit a response to the request that includes an account number associated with the token. The token retriever system is configured to receive the account number and to display the account number for a predetermined period of time.

17 Claims, 1 Drawing Sheet

(51) Int. Cl.
  *H04L 29/06* (2006.01)
  *G06Q 20/40* (2012.01)

(56) References Cited

U.S. PATENT DOCUMENTS

| | | |
|---|---|---|
| 6,598,031 B1 | 7/2003 | Ice |
| 6,938,019 B1 | 8/2005 | Uzo |
| 6,938,022 B1 | 8/2005 | Singhal |
| 6,990,470 B2 | 1/2006 | Hogan et al. |
| 7,082,415 B1 | 7/2006 | Robinson et al. |
| 7,376,629 B1 | 5/2008 | McIsaac et al. |
| 7,451,481 B2 | 11/2008 | Bauer et al. |
| 7,512,236 B1 | 3/2009 | Zhu |
| 8,010,791 B2 | 8/2011 | Bauer et al. |
| 8,346,671 B2 | 1/2013 | Zloth et al. |
| 8,417,947 B2 | 4/2013 | Bauer et al. |
| 8,726,018 B2 | 5/2014 | Marshall et al. |
| 9,589,257 B2 | 3/2017 | Bauer Marshall et al. |
| 2002/0007320 A1 | 1/2002 | Hogan et al. |
| 2002/0022967 A1 | 2/2002 | Ohkado |
| 2002/0133467 A1 | 9/2002 | Hobson et al. |
| 2002/0180584 A1 | 12/2002 | McGregor et al. |
| 2002/0191020 A1 | 12/2002 | Kaply et al. |
| 2003/0046237 A1 | 3/2003 | Uberti |
| 2003/0061171 A1 | 3/2003 | Gilbert et al. |
| 2004/0070566 A1 | 4/2004 | Ashton |
| 2004/0073688 A1 | 4/2004 | Sampson |
| 2004/0172309 A1 | 9/2004 | Selwanes et al. |
| 2004/0182921 A1 | 9/2004 | Dickson et al. |
| 2004/0210449 A1 | 10/2004 | Breck et al. |
| 2005/0198111 A1 | 9/2005 | Lamb et al. |
| 2007/0005511 A1 | 1/2007 | Martinez |
| 2007/0023504 A1 | 2/2007 | Blankenship et al. |
| 2008/0017712 A1 | 1/2008 | Hart et al. |
| 2008/0215887 A1 | 9/2008 | Hart et al. |
| 2009/0327701 A1 | 12/2009 | Holz |
| 2011/0154466 A1* | 6/2011 | Harper ............... G06Q 20/34 726/9 |
| 2014/0013452 A1* | 1/2014 | Aissi .................. G06F 21/85 726/30 |
| 2015/0312248 A1 | 10/2015 | Pruthi et al. |
| 2016/0119296 A1 | 4/2016 | Laxminarayanan et al. |
| 2017/0221054 A1* | 8/2017 | Flurscheim ........ G06Q 20/3276 |
| 2018/0068297 A1 | 3/2018 | Goodman et al. |
| 2018/0130060 A1* | 5/2018 | Hayes .............. G06Q 20/4014 |
| 2018/0268414 A1 | 9/2018 | Chung et al. |

FOREIGN PATENT DOCUMENTS

| | | |
|---|---|---|
| KR | 20070117420 | 12/2007 |
| KR | 20090124137 | 12/2009 |
| KR | 20100006004 | 1/2010 |
| WO | 2006/119253 | 11/2006 |

OTHER PUBLICATIONS

Mark, Heather, "Storing Credit Card Data, A Look at the Business Needs, Regulations and Solutions Surrounding the Issue", CISSP, Jan. 2006, 44 pages.

Letter from Michael J. Andelson of Best Best & Krieger LLP to Christopher Justice, President, Merchant Link, LLC and Michael P Duffy, Chief Executive Officer of Chase Paymentech Solutions, LLC dated Dec. 14, 2006, 4 pages.

International Search Report and Written Opinion in PCT/US2006/16745 dated Jun. 18, 2007 (10 pages).

Office Action from corresponding Canadian Patent Application No. 2,606,183, dated Jan. 28, 2011 (4 pages).

Notification of Transmittal of the International Search Report and Written Opinion of the International Search Authority—The European Patent Office—dated Mar. 18, 2020 for International Application No. PCT/US20/12877, 16 pages.

* cited by examiner

SYSTEM AND METHOD FOR SECURE DETOKENIZATION

TECHNICAL FIELD

The present disclosure relates generally to data transaction security, and more specifically to a system and method for secure detokenization of tokenized data.

BACKGROUND OF THE INVENTION

Converting secure data into an encrypted form to protect the secure data from misuse is known. For example, U.S. Pat. No. 7,451,481, commonly owned and assigned with the pending application, discloses a database system and method for encryption and protection of confidential information, and is hereby incorporated by reference for all purposes as if set forth herein in its entirety. However, access to the encrypted information in U.S. Pat. No. 7,451,481 by a secure system over a public network is prevented, to ensure data security.

SUMMARY OF THE INVENTION

A system for accessing protected data is disclosed that includes a token retriever system operating on a processor and configured to receive a token from a user and to transmit a request including the token to a detokenization system over a data communications medium. The detokenization system is configured to receive the token, to verify that the request has been received from an authorized source, and to transmit a response to the request that includes an account number and its expiration date associated with the token. The token retriever system is also configured to receive the account number and to display the account number for a predetermined period of time.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
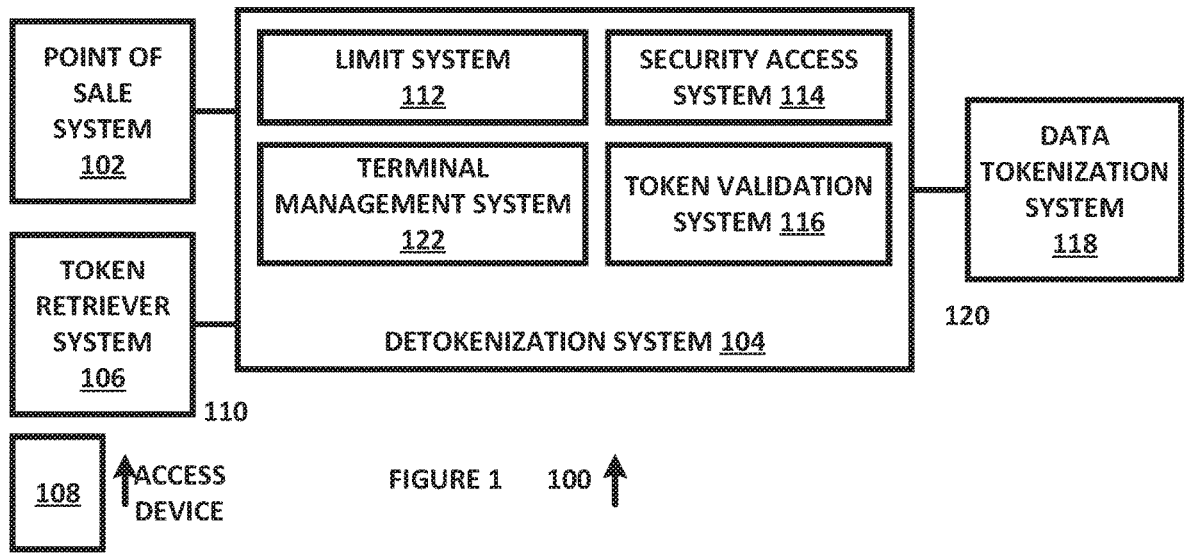
FIG. 1 is a diagram of a system for providing secure detokenization, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

FIG. 1 is a diagram of a system 100 for providing secure detokenization, in accordance with an example embodiment of the present disclosure. System 100 includes point of sale system 102, token retriever system 106, data tokenization system 118 and detokenization system 104, which further includes limit system 112, security access system 114, token validation system 116 and terminal management system 122, each of which can be implemented in hardware or a suitable combination of hardware and software.

Point of sale system 102 can be a credit card reader or other suitable device that includes a processor, one or more memory devices, input/output devices and other components that allow algorithms to be stored in the one or more memory devices and used by the processor to access the input/output devices and to perform algorithmic functions on data received at an input device, to allow processed data to be provided to an output device. Point of sale system 102 includes one or more algorithms that are configured to use a card reader device to read an account number from a credit card with a magnetic stripe, a near field communication (NFC) chip or other suitable security devices and to transmit the account number to a data tokenization system 118 over a public network, such as network 110, for generation of a token. In one example embodiment, the token can be used in place of the account number, such as to eliminate the need for the account number to be made available at point of sale system 102. Because point of sale system 102 can include programmable features and can receive one or more algorithm updates from a remote location to modify the functionality of point of sale system 102, it can be the target of malignant software code (or "malware") that can be used by an unauthorized third party to obtain the account number. Using processes such as those disclosed in U.S. Pat. No. 7,451,481, the account number can be replaced with encrypted data that can be used like a token, to represent the account number for transaction processing. In this manner, the account number can be protected from access by malware, but the account number may be required at a point in the future, such as to resolve a charge dispute. While U.S. Pat. No. 7,451,481 discloses that a centralized encryption and data access system can be used to translate between the encrypted data and the account number, the centralized system cannot be used to address every situation in which the original account number is needed.

Token retriever system 106 is a portable specialized data processing system that is separate and distinct from point of sale system 102, and can be an Ingenico iWL 252 PIN pad or other suitable devices that have limited software update functionality. Token retrieval system 106 includes a processor, one or more memory devices, input/output devices and other components that allow algorithms to be stored in the one or more memory devices and used by the processor to access the input/output devices and to perform algorithmic functions on data received at an input device, to allow processed data to be provided to an output device for transmission over a public network such as network 110 to detokenization system 104. In one example embodiment, token retriever system 106 can transmit encoded data that represents a confidential account number (which can be referred to as a "token") to detokenization system 104, and can receive data from detokenization system 104 that represents the account number, an expiration date and other suitable data. The data received from detokenization system 104 can be one or more data packet, data frame or other suitable data structures, can be encrypted and can include other data security protection. Token retriever system 106 can include one or more algorithms that cause the processor of token retriever system 106 to receive and decrypt the one or more data packet or frame to extract the account number, to perform other suitable security processing on the one or more data packet or frame, and then to display the account number associated with the token data for a predetermined period of time, such as 2 minutes. After the period of time has elapsed, the account number can be irrevocably deleted, such as by writing over the data buffer where the account number is stored with a null data set or in other suitable manners. Token retriever system 106 can provide greater security than point of sale system 102, because the ability to modify the algorithms that operate on token retriever system 106 is more limited than the ability to modify the algorithms that operate on point of sale system 102 or other similar systems. In addition, an access device 108 is required to enable token retriever system 106 to operate, such as a card with encoded identification data stored in a semiconductor memory device, a magnetic stripe or other suitable devices. Access device 108 can be locally authenticated, remotely authenticated or can use other processes to control access to token retriever system 106. Token retriever system 106 can thus be used at different workstations, such as when a bank payment device is not located close to a workstation where a charge is being finalized. In this manner, a user can bring token retriever system 106 to a bank terminal, and eliminates the need to write down account information in an unsecure manner, such as on a note pad.

Detokenization system 104 includes a processor, one or more memory devices, input/output devices and other components that allow algorithms to be stored in the one or more memory devices and used by the processor to access the input/output devices and to perform algorithmic functions on data received at an input device, to allow processed data to be provided to an output device. Detokenization system 104 can receive a request to detokenize a data string from a token retriever system 106 and can access tokenized data at a data tokenization system 118 over a secure network such as network 120. The data string can include unique numbers that are used to represent credit card account numbers in a system such as U.S. Pat. No. 7,451,481 or other suitable systems, which can be protected behind a secure data network, a firewall system and using other security measures, to prevent a user on a public data network from directly accessing the secure data network. For example, a malicious user on a public data network can send repeated attempts to access a data processing system that is accessible over the public network until access is obtained, and placing data tokenization in systems that cannot be directly accessed over such public networks improves the security of the confidential information that is being tokenized. Thus, while allowing detokenization system 104 to access such data tokenization systems over a secure network introduces some risk of unauthorized access to the confidential data, detokenization system 104 is configured to provide additional security measures, in addition to firewall protection, access protection and other conventional forms of data security, as discussed herein.

Limit system 112 operates on the processor of detokenization system 104 or other suitable processors, receives data representing a detokenization request and determines whether a number of detokenization requests exceeds a predetermined threshold. In one example embodiment, the threshold can be implemented as a security measure, and can be based on a number of detokenization requests that would normally be expected for a typical establishment that operates token retriever system 106. In this embodiment, a limit can be establish in a hosted system as a security measure to limit an overall detokenization exposure in case of compromise, where the limit can be predetermined and only be changed remotely with a software download to the associated token retriever system 106 or in other suitable manners. Limit system 112 provides additional security by preventing mass detokenization requests from being submitted by a malicious actor, and limits the number of detokenization requests and associated risk of loss, unless additional detokenization requests are requested by an approved operator or using an approved security protocol. In addition, limit system 112 can implement one or more security measures if repeated requests are received from a token retriever system 106 that exceed an allowed number of requests, such as to notify a predetermined user, to shut down operation of the token retriever system 106 or to perform other suitable functions.

Security access system 114 operates on the processor of detokenization system 104 or other suitable processors, receives data representing a detokenization request and determines whether the detokenization request is from a valid requester. In one example embodiment, a requester can have an associated access device 108, which can include a card with a near field communications chip, a magnetic stripe or other suitable data storage devices, and token retriever system 106 can read encoded data from the data storage device that identifies the location of token retriever system 106, an identifier of the user of access device 108, an identifier of access device 108 and other suitable data that is used to identify token retriever system 106, access device 108 and a user. The user data can be evaluated to determine whether the user is an authorized user for the associated access device 108 and token retriever system 106, such as by using a password, biometric data or other suitable data. User security data processing can also or alternatively be performed locally at token retriever system 106, using a third party system or in other suitable manners. In addition, security access system 114 can implement one or more security measures if repeated requests are received from a token retriever system 106 that do not have a valid source identifier, such as to notify a predetermined user, to shut down operation of the token retriever system 106 or to perform other suitable functions.

Token validation system 116 operates on the processor of detokenization system 104 or other suitable processors, receives data representing a detokenization request and determines whether the detokenization request is from a valid requester. In one example embodiment, tokenized data can include one or more data fields or combinations of data fields that are used to identify the source of the tokenized data, such as a set of numeric values in predetermined data fields, a predetermined sequence of data or other suitable data. In addition, token validation system 116 can implement one or more security measures if repeated requests are received from a token retriever system 106 that do not have a valid source identifier, such as to notify a predetermined user, to shut down operation of the token retriever system 106 or to perform other suitable functions. In one example embodiment, a token can be required to pass a local token format check, the token can be verified to determine that it is a validly issued token of detokenization system 104 and is not a token from a third party token, can be verified to ensure that it been issued to a merchant associated with token retriever system 106 (such as where system 100 issues tokens as a function of an individual location or preconfigured group of locations, where the same token does not represent an account number for all merchants but only for a specific merchant and possibly a specific merchant location), the formatting can be checked again at detokenization system 104, and other suitable processes can also or alternatively be used.

Terminal management system 122 operates on the processor of detokenization system 104 or other suitable processors, and interfaces with token retriever system 106 to provide software updates, security certificate replacement, device health evaluation and other suitable functions. In one example embodiment, terminal management system 122 can periodically query a token retriever system 106 to verify that it has not been tampered with, can request data such as a security certificate, can transmit a new security certificate, can run device operational tests and can perform other suitable functions.

Figure 2:
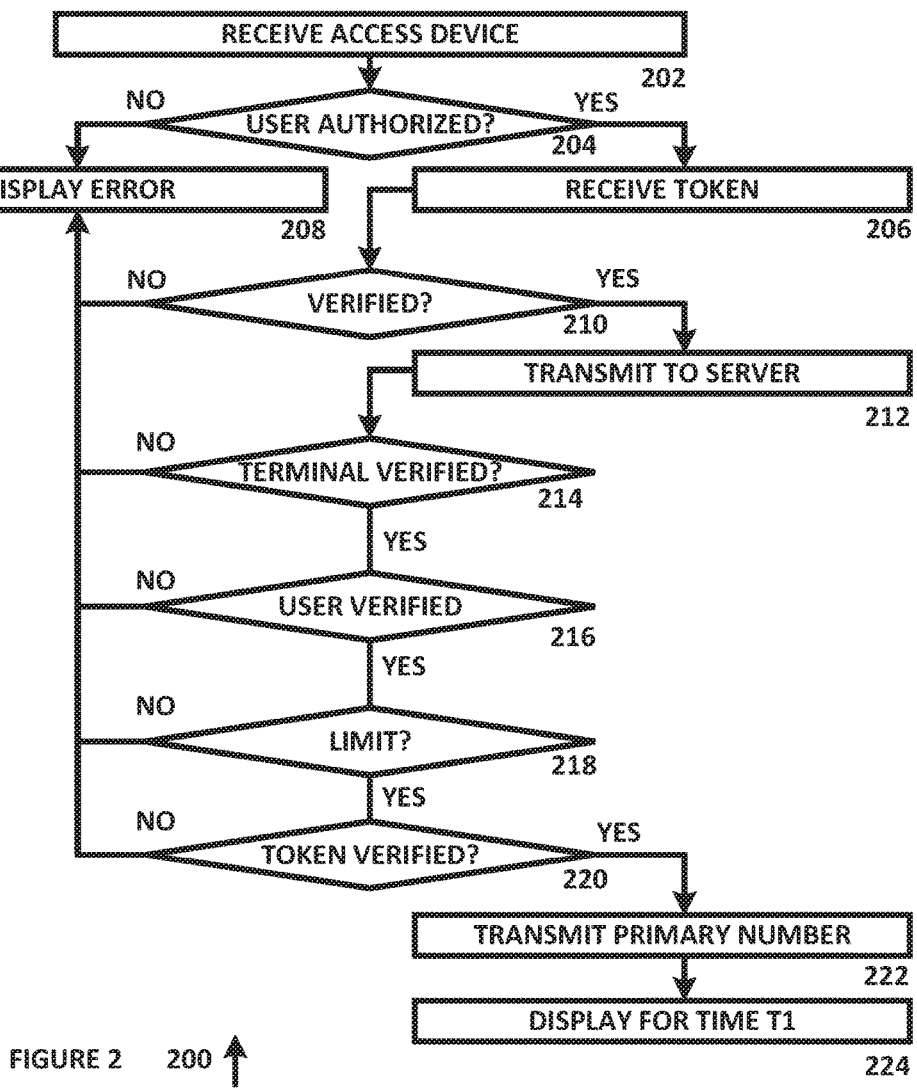
FIG. 2 is a flow chart of an algorithm for providing secure detokenization, in accordance with an example embodiment of the present disclosure.

FIG. 2 is a flow chart of an algorithm 200 for providing secure detokenization, in accordance with an example embodiment of the present disclosure. Algorithm 200 can be implemented in hardware or a suitable combination of hardware and software, such as by compiling source code into machine code and then linking the machine code to one or more processors and associated data link libraries, input/output devices, data memory devices and so forth. Although algorithm 200 is shown as a flow chart, it can also or alternatively be implemented as a state machine, using object-oriented programming or in other suitable manners.

Algorithm 200 begins at 202, where an access device is received at a token retriever system. In one example embodiment, the access device can be a card having a magnetic stripe, an NFC chip or other suitable data storage devices that are used to identify a specific user, a location associated with the user and other suitable data. The access device data can be periodically updated using a hash or other suitable dynamic data to reduce the risk of misappropriation of the data of the access device. The algorithm then proceeds to 204.

At 204, it is determined whether a user is authorized. In one example embodiment, the user data can be checked against a local or remote database of users, a remote database of locations where the user is authorized to use a token retriever system, or other suitable data, and additional processes can also or alternatively be used, such as password authentication, biometric authentication, two-step authentication by transmission of an access code to a device of record or other suitable processes. If the user is authorized, the algorithm proceeds to 206, otherwise the algorithm proceeds to 208 where an error message is displayed, such as to the user or to an account administrator.

At 206, a token is received. In one example embodiment, the token can be manually entered into a data entry device, can be selected from a list of available tokens using a user interface device or can be selected in other suitable manners. The algorithm then proceeds to 210.

At 210, it is determined whether the source requesting the token has been verified. In one example embodiment, a source can be verified by an IP address, by using physical address data stored at the terminal or in other suitable manners. If the source requesting the token is not verified, the algorithm proceeds to 208, otherwise the algorithm proceeds to 214.

At 214, it is determined whether the terminal has been verified. In one example embodiment, a terminal can be verified by a terminal identifier, by a software version identifier or in other suitable manners. In another example embodiment, a terminal identifier hosted at a detokenization system or other suitable locations can be required to be enabled before detokenization is performed, such as by determining whether a "detokenization allowed" flag has been set to "on" to enable the functionality of a detokenization system, or in other suitable manners. If the terminal is not verified, the algorithm proceeds to 208, otherwise the algorithm proceeds to 216.

At 216, it is determined whether the user has been verified. In one example embodiment, a user can be verified by determining whether the user is associated with the token retriever system, with an entity that operates the token retriever system or in other suitable manners. If the user is not verified, the algorithm proceeds to 208, otherwise the algorithm proceeds to 218.

At 218, it is determined whether a limit on the number of detokenization procedures has been reached. In one example embodiment, each token retriever system can have an associated number of detokenization procedures that it is allowed to perform, such as based on the location of the token retriever system, the historical number of detokenization procedures performed with the token retriever system in a predetermined period of time or in other suitable manners. If the limit has been reached, the algorithm proceeds to 208, otherwise the algorithm proceeds to 220.

At 220, it is determined whether the token has been verified. In one example embodiment, a token can have a predetermined format, a predetermined relationship between data values in the token or other suitable structural parameters. If the token is not verified, the algorithm proceeds to 208, otherwise the algorithm proceeds to 222.

At 222, the primary account number is transmitted. In one example embodiment, the token can be transmitted over a secure data network from a detokenization system to a data tokenization system that converted the primary account number into the token, or other suitable processes can be used. Once the primary account number is received at the detokenization system it can be compiled into one or more packets or frames, encrypted and otherwise processed for transmission to a token retriever system or other suitable devices. The algorithm then proceeds to 224.

At 224, the primary account number is displayed for a predetermined period of time T1. In one example embodiment, a token retriever system can have limited predetermined algorithmic functionality that is installed on a processor and which causes transmitted data to be received, decrypted, reconstructed into a data string having predetermined parameters and displayed on a display for a predetermined period of time. As part of any display, the data may be temporarily stored in a buffer, and after the predetermined time period, the buffer can be purged by storing null data values or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for accessing protected data comprising:
a token retriever system operating on a first processor and configured to receive a token from a user and to transmit a request including the token to a detokenization system over a data communications medium;
the detokenization system operating on a second processor and configured to receive the token, to verify that the request has been received from an authorized source, and to transmit a response to the request that includes an account number associated with the token; and
wherein the token retriever system is configured to receive the account number and to display the account number for a predetermined period of time.

2. The system of claim 1 wherein the token retriever system is configured to receive an access device and to determine whether the access device is associated with an authorized user.

3. The system of claim 1 wherein the detokenization system further comprises a limit system configured to limit a number of detokenization procedures from the token retriever system within a predetermined period of time.

4. The system of claim 1 wherein the detokenization system further comprises a terminal management system configured to interface with the token retriever system and to authenticate the token retriever system.

5. The system of claim 1 wherein the detokenization system further comprises a terminal management system configured to interface with the token retriever system and to replace a security certificate at the token retriever system.

6. The system of claim 1 wherein the detokenization system further comprises a terminal management system configured to interface with the token retriever system and to determine a state of operation of the token retriever system.

7. The system of claim 1 wherein the detokenization system further comprises a security access system configured to interface with the token retriever system and an access device and to determine whether the access device is associated with an authorized user.

8. The system of claim 1 wherein the token retriever system further comprises a first security access system configured to interface with an access device and to determine whether the access device is associated with an authorized user, and the detokenization system further comprises a second security access system configured to interface with the first security access system and the access device and to determine whether the access device is associated with an authorized user.

9. A method for accessing protected data comprising:
receiving a token from a user at a token retriever system operating on a first processor;
transmitting a request including the token from the token retriever system to a detokenization system over a data communications medium;
receiving the token at the detokenization system;
verifying that the request has been received from an authorized source;
transmitting a response to the request that includes an account number associated with the token; and
receiving the account number at the token retriever system; and
displaying the account number for a predetermined period of time.

10. The method of claim 9 further comprising:
receiving an access device at the token retriever system; and
determining whether the access device is associated with an authorized user.

11. The method of claim 9 further comprising limiting a number of detokenization procedures from the token retriever system within a predetermined period of time.

12. The method of claim 9 further comprising interfacing with the token retriever system using a terminal management system to authenticate the token retriever system.

13. The method of claim 9 further comprising interfacing with the token retriever system to replace a security certificate at the token retriever system.

14. The method of claim 9 further comprising interfacing with the token retriever system to determine a state of operation of the token retriever system.

15. The method of claim 9 further comprising interfacing with the token retriever system and an access device to determine whether the access device is associated with an authorized user.

16. The method of claim 9 further comprising:
interfacing with an access device at a detokenization system to determine whether the access device is associated with an authorized user; and
interfacing with the detokenization system and the access device and to determine whether the access device is associated with the authorized user.

17. In a system for accessing protected data having a token retriever system operating on a first processor and configured to receive a token from a user and to transmit a request including the token to a detokenization system over a data communications medium, the detokenization system operating on a second processor and configured to receive the token, to verify that the request has been received from an authorized source, and to transmit a response to the request that includes an account number associated with the token, and wherein the token retriever system is configured to receive the account number and to display the account number for a predetermined period of time, wherein the token retriever system is configured to receive an access device and to determine whether the access device is associated with an authorized user, wherein the detokenization system further comprises a limit system configured to limit a number of detokenization procedures from the token retriever system within a predetermined period of time, wherein the detokenization system further comprises a terminal management system configured to interface with the token retriever system and to authenticate the token retriever system, wherein the terminal management system is configured to interface with the token retriever system and to replace a security certificate at the token retriever system, wherein the terminal management system configured to interface with the token retriever system and to determine a state of operation of the token retriever system, wherein the detokenization system further comprises a security access system configured to interface with the token retriever system and the access device and to determine whether the access device is associated with an authorized user, wherein the token retriever system further comprises a first security access system configured to interface with the access device and to determine whether the access device is associated with an authorized user, and the detokenization system further comprises a second security access system configured to interface with the first security access system and the access device and to determine whether the access device is associated with an authorized user, a method for accessing protected data comprising:
receiving a token from a user at a token retriever system operating on a first processor;
transmitting a request including the token from the token retriever system to a detokenization system over a data communications medium;
receiving the token at the detokenization system;
verifying that the request has been received from an authorized source;
transmitting a response to the request that includes an account number associated with the token;
receiving the account number at the token retriever system;
displaying the account number for a predetermined period of time;
receiving an access device at the token retriever system;
determining whether the access device is associated with an authorized user;
limiting a number of detokenization procedures from the token retriever system within a predetermined period of time;
interfacing with the token retriever system using a terminal management system to authenticate the token retriever system;
interfacing with the token retriever system to replace a security certificate at the token retriever system;
interfacing with the token retriever system to determine a state of operation of the token retriever system;
interfacing with the token retriever system and the access device to determine whether the access device is associated with an authorized user;
interfacing with the access device at a detokenization system to determine whether the access device is associated with the authorized user; and
interfacing with the detokenization system and the access device and to determine whether the access device is associated with the authorized user.

* * * * *